(12) United States Patent
Batshon et al.

(10) Patent No.: US 7,991,070 B2
(45) Date of Patent: Aug. 2, 2011

(54) WAVELENGTH TRANSMISSION SYSTEM AND METHOD USING 3-DIMENSIONAL LDPC-CODED MODULATION

(75) Inventors: Hussam G. Batshon, Tucson, AZ (US); Ivan B. Djordjevic, Tucson, AZ (US); Lei Xu, Princeton, NJ (US); Ting Wang, Princeton, NJ (US); Milorad Cvijetic, Herndon, VA (US)

(73) Assignee: NEC Laboratories America, Inc., Princeton, NJ (US)

( * ) Notice: Subject to any disclaimer, the term of this patent is extended or adjusted under 35 U.S.C. 154(b) by 610 days.

(21) Appl. No.: 12/050,507

(22) Filed: Mar. 18, 2008

(65) Prior Publication Data

US 2009/0052907 A1 Feb. 26, 2009

Related U.S. Application Data

(60) Provisional application No. 60/956,797, filed on Aug. 20, 2007.

(51) Int. Cl.
*H04L 27/04* (2006.01)
*H04L 27/227* (2006.01)
*H04B 10/145* (2006.01)
*H04B 10/148* (2006.01)

(52) U.S. Cl. ......... 375/295; 375/341; 398/182; 398/202

(58) Field of Classification Search ................... 375/295, 375/298, 260–261, 316, 324, 340–341, 300, 375/308, 329; 398/140, 182, 202, 204; 714/799–800, 804, E11.03, 701, 746, 750–752, 714/795, 801; 329/304; 332/103

See application file for complete search history.

(56) References Cited

U.S. PATENT DOCUMENTS

| 5,479,447 A | 12/1995 | Chow et al. |
| 7,139,964 B2 | 11/2006 | Shen et al. |
| 2010/0020675 A1* | 1/2010 | Choi et al. ................... 370/210 |

OTHER PUBLICATIONS

Kim et al., A New Family of Space/Wavelength/Time Spread Three-Dimensional Optical Code for OCDMA Networks, 2000, Journal of Lightwave Technology, vol. 18, pp. 502-511.*
Batshon et al., Proposal to Achieve 1 Tb/s per Wavelength Transmission Using Three-Dimensional LDPC-Coded Modulation, 2008, IEEE Photonics Technology Letters, vol. 20, No. 9, pp. 721-723.*

(Continued)

*Primary Examiner* — Tesfaldet Bocure
*Assistant Examiner* — Lawrence Williams
(74) *Attorney, Agent, or Firm* — James Bitetto; Joseph Kolodka (57) ABSTRACT

A transmitter and method include a LDPC encoder configured to encode source data, and a mapper configured to generate three coordinates in accordance with a 3D signal constellation where the coordinates include an amplitude coordinate and two phase coordinates. A laser source is modulated in accordance with each of the three coordinates to provide a transmission signal. A receiver, includes a demapper receives an input signal from three branches to demap the input signal using a three-dimensional signal constellation having three coordinates. The three branches include a direct detection branch, and two coherent detection branches such that the direct detection branch detects an amplitude coordinate of the input signal and the two coherent detection branches detect in-phase and quadrature coordinates of the input signal. A bit prediction module and at least one LDPC decoder are configured to iteratively decode bits by feeding back extrinsic LLRs to the demapper.

14 Claims, 5 Drawing Sheets

OTHER PUBLICATIONS

McGeehan et al., Experimental Demonstation of OCDMA Transmission Using a Three-Dimensional (Time-Wavelength-Polarization) Codeset, Oct. 2005, Journal of Lightwave Technology, vol. 23, No. 10, pp. 3282-3289.*

Djordjevic et al., Using LDPC-Coded Modulation and Coherent Detection for Ultra Highspeed Optical Transmission, Nov. 2007, Journal of Lightwave Technology, vol. 25, No. 11, pp. 3619-3625.*

Batshon et al., Proposal to Achive 1 Tb/s per Wavelength Transmission Using Three-Dimensioanl LDPC-Coded Modulation, May 1, 2008, IEEE Photonics Technology Letters, vol. 20, No. 9, pp. 721-723.*

Djordjevic et al. 'Proposal for Beyond 100-Gb/s Optical Transmission Based on Bit-Interleaved LDPC-Coded Modulation', In: IEEE Photonics Technology Letters, Jun. 2007, vol. 19, No. 12, pp. 874-876.

* cited by examiner

WAVELENGTH TRANSMISSION SYSTEM AND METHOD USING 3-DIMENSIONAL LDPC-CODED MODULATION

RELATED APPLICATION INFORMATION

This application claims priority to provisional application Ser. No. 60/956,797 filed on Aug. 20, 2007, incorporated herein by reference.

BACKGROUND

1. Technical Field

The present invention relates to optical communication, and more particularly to a modulation system and method for using three-dimensional (3D) Low Density Parity Check (LDPC) coded modulation.

2. Description of the Related Art

Optical communication systems are rapidly developing to meet the ever increasing transmission capacity demands. Electrically time-division multiplexed (ETDM) transmitters and receivers operating at 100 Gb/s are becoming commercially available. Despite the cost, the major concerns at such high speed are the polarization mode dispersion (PMD), and the intrachannel nonlinearities. Consequently, approaches of achieving beyond 100-Gb/s transmission using commercially available components operating at lower speed are becoming increasingly important.

SUMMARY

A transmitter and method include an LDPC encoder configured to encode source data, and a mapper configured to generate three coordinates in accordance with a 3D signal constellation where the coordinates include an amplitude coordinate and two phase coordinates. A power source is modulated in accordance with each of the three coordinates to provide a transmission signal.

A receiver, includes a demapper which receives an input signal from three branches to demap the input signal using a three-dimensional signal constellation having three coordinates. The three branches include a direct detection branch, and two coherent detection branches such that the direct detection branch detects an amplitude coordinate of the input signal and the two coherent detection branches detect in-phase and quadrature coordinates of the input signal. A bit prediction module and at least one LDPC decoder are configured to iteratively decode bits by feeding back extrinsic LLRs to the demapper.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 1 is a block diagram showing a transmitter and transmission method using the three-dimensional bit-interleaved low-density parity-check coded modulation (3D BI-LDPC-CM) scheme in accordance with the present principles;

FIG. 2 is a block diagram showing a hybrid coherent/direct detection receiver and receiver method using the 3D BI-LDPC-CM scheme in accordance with the present principles;

FIG. 3 is a constellation diagram for a 64-ary 2-dimensional constellation in accordance with the present principles;

FIG. 4 is a constellation diagram for a 64-ary 3-dimensional constellation in accordance with the present principles; and FIGS. 5 and 6 are plots showing bit error rate (BER) versus optical signal to noise ratio (OSNR) performance of 2D and 3D LDPC-CM schemes for: 40-Giga symbols/s (FIG. 5), and 100-Giga symbols/s (FIG. 6).

DETAILED DESCRIPTION OF PREFERRED EMBODIMENTS

In accordance with the present principles, three-dimensional low-density parity-check (LDPC) coded modulation (3D-LDPC-CM) systems and methods enable transmission beyond 100-Gb/s, and more preferably beyond 320-Gb/s rates using, e.g., commercially available components operating at say, 40-Giga symbols/s. To achieve such aggregate rates, the present principles provide: (i) an additional (third) basis function for a signal constellation; (ii) to facilitate a decoder implementation, a structured LDPC code is employed; and (iii) to improve performance, an iterative exchange of the extrinsic soft bit-reliabilities between an a posteriori probability (APP) demapper and an LDPC decoder is conducted.

The added basis function increases the Euclidean distance between the signal constellation points for the same average power per constellation point compared to an equivalent M-ary 2D constellation, leading to the improved bit-error ratio (BER) performance. The 3D LDPC-CM offers an improvement of up to 4.1 dB over a corresponding two-dimensional (2D) modulation scheme, and provides, e.g., up to 14 dB overall net effective gain at BER $10^{-9}$. The LDPC (8547,6922) code of rate 0.8098, illustratively employed herein, belongs to the class of balanced-incomplete block-design (BIBD) based LDPC codes of girth-8. Decoding may be based on an efficient implementation of sum product algorithm.

The present principles may be employed in many technical areas and in particular find utility in ultra-high-speed optical transmission systems to achieve Nx40-Gb/s aggregate rate (N=4, 16, . . . ) or in a next generation of Ethernet. Since Ethernet has grown in 10-fold increments 100-Gb/s transmission is envisioned as the transmission technology for next generation of Ethernet.

The present coded-modulation scheme employing a 1024-3D-constellation can also achieve a 1-Tb/s aggregate rate using transmission equipment operating at 100-Giga symbols/s.

Embodiments described herein may be entirely hardware, entirely software or including both hardware and software elements. In a preferred embodiment, the present invention is implemented in hardware with software elements. The software may include but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Figure 1:
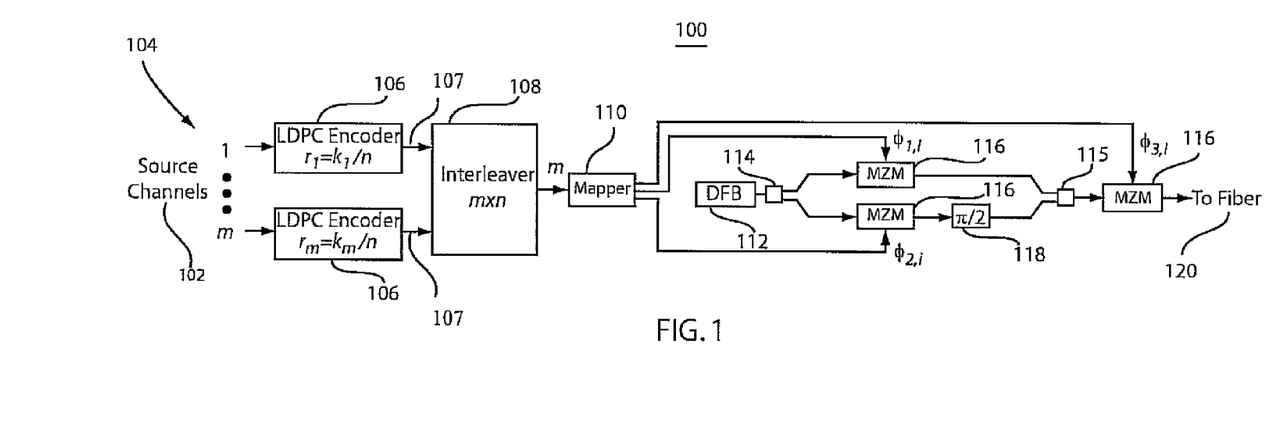

Referring now to the drawings in which like numerals represent the same or similar elements and initially to FIG. 1, architecture of a transmitter 100 employing a LDPC-coded modulation scheme is illustratively shown. Bit streams 104 coming from m different information sources 102 are encoded using different $(n,k_p)$ LDPC codes in the set of encoders 106. (For an $(n,k_p)$ LDPC code, n is the codeword length which is the same for all LDPC codes and $k_p$ is the number of information bits of the pth component LDPC code, where p∈{1, 2, . . . , m}, (code rate $r_p=k_p/n$)). Using different LDPC codes allows optimal code rate allocation. Employing identical LDPC codes for all components is a special case of the multilevel coding (MLC) scheme that is called the bit-interleaved coded modulation (BITC) scheme. The encoded bit streams 107 are written row-wise to an m×n block-interleaver 108. At time instance i, a mapper 110 reads m bits column-wise to determine the corresponding M-ary signal constellation point $s_i=(\phi_{1,i},\phi_{2,i},\phi_{3,i})$.

In Equation (1), we denote orthonormal basis functions as $\Phi_1$, $\Phi_2$, and $\Phi_3$, where T is a symbol duration and 0<t<T.

$$\Phi_1(t) = \frac{1}{\sqrt{T}}\sin\left(\frac{2\pi t}{T}\right), \qquad (1)$$

$$\Phi_2(t) = \frac{1}{\sqrt{T}}\cos\left(\frac{2\pi t}{T}\right),$$

$$\Phi_3(t) = \frac{1}{\sqrt{T}}$$

This forms a three-dimensional (3D) M-ary constellation. The 3D M-ary constellation is formed using identical 2D signal-constellation points constructed on parallel layers equally spaced at distance a. (see FIGS. 3 and 4). The symbol $c=(c_1, c_2, \ldots, c_m)$ is divided into two groups of bits. The left-most group of l bits, defines the amplitude coordinate $\phi_3$ and so defines a layer index, while the right-most group of m−l bits, defines the coordinates $\phi_1$ and $\phi_2$ and determines a location of the constellation point within the layer. The amplitude coordinate $\phi_3$ cannot be set to zero as the phase coordinates $\phi_1$ and $\phi_2$ will be cancelled. As an illustration of the bit arrangements, observe a 64-ary 3D-constellation, in which each symbol carries 6 bits. Possible arrangements of the bits include: (i) 64-constellation points are split into two 32 2D layers (l=1), (ii) 64-constellation points are split into four 16-point layers l=2, etc.

The coordinates $\phi_1$ and $\phi_2$ are used for modulation in modulators 116 (e.g., Mach-Zehnder Modulators (MZM)). In this case, the power source is a distributed feedback (DFB) optical source (laser) 112. A phase shifter 118 is employed at the output of one of the modulators 116 so that the signals can be combined by a coupler and modulated by $\phi_3$ in a third modulator 116 and transmitted to/on a fiber 120.

Figure 2:
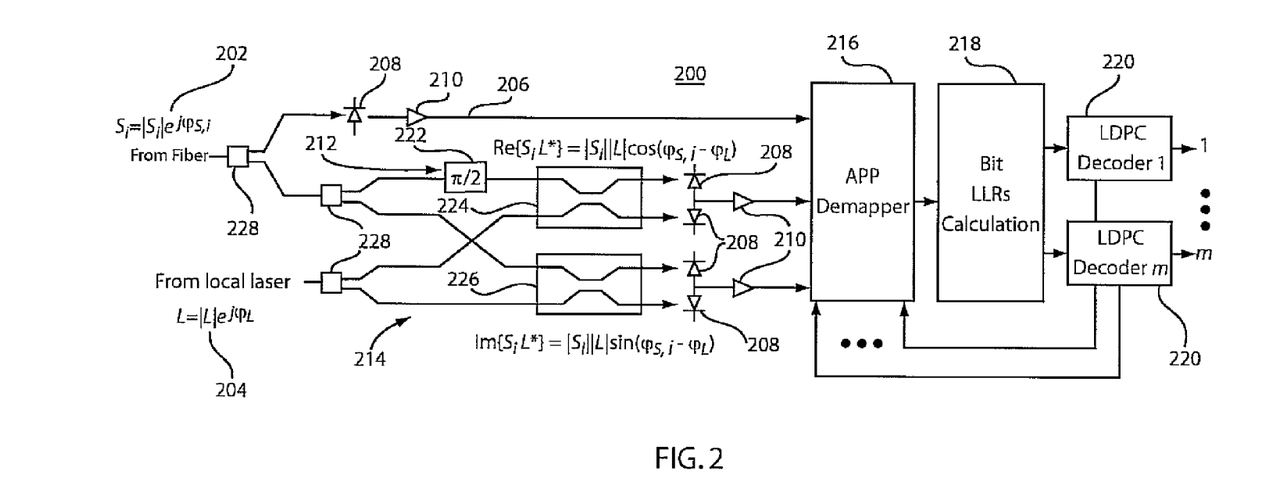

Referring to FIG. 2, an architecture of a hybrid coherent/direct detection receiver 200 is illustratively shown. The receiver 200 employs the LDPC-coded modulation scheme in accordance with the present principles. The hybrid receiver 200 uses direct detection for the amplitude coordinate $\phi_3$, and coherent detection for phase (in-phase and quadrature) coordinates $\phi_1$ and $\phi_2$. A received electrical field 202 at the ith transmission interval is denoted by $S_i=|S_i|e^{j\Phi_{S_i}}$, $\phi_{S,i}=\phi_i\phi_{S,PN}$, where a data phasor $\phi_i\in\{0, 2\pi/2^{m-l}, \ldots, 2\pi(2^{m-l}-1)/2^{m-l}\}$ and $\phi\beta S,PN$ denote a laser phase noise process of a transmitting laser. A local laser electrical field 204 is denoted by $L=|L|e^{j\Phi_L}$, where $\phi_L$ is the laser phase noise process of the local laser. An amplitude detection branch 206 has an output that is proportional to $|S_i|^2$. Energy from the fiber and from the local laser are coupled by couplers 224 and 226 in accordance with Equation (2). A phase shifter 222 and splitters 228 are employed. The outputs of the upper- and lower-balanced branches 212 and 214 are proportional to Re{$S_iL^*$} and Im{$S_iL^*$}, as given below:

$$Re\{S_iL^*\}=|S_i||L|\cos(\phi_i+\phi_{S,PN}-\phi_L)$$

The three branches 206, 212 and 214 include photodetectors 208 which convert optical signals to electrical signals. Amplifiers 210 may be employed. The outputs of the three branches 206, 212 and 214 are sampled at a symbol rate and corresponding samples are forwarded to an a posteriori probability (APP) demapper 216, which processes the samples. The demapper 216 provides bit log-likelihood ratios (LLRs) computed by a bit predictor (LLR calculation module) 218 needed for iterative LDPC decoding. These LLRs are calculated as follows:

$$\lambda(s_i) = \log\frac{P(s_i = s_0 | r_i)}{P(s_i \neq s_0 | r_i)}, \qquad (3)$$

where $P(s_i|r_i)$ is determined by Bayes' rule as:

$$P(s_i | r_i) = \frac{P(r_i | s_i)P(s_i)}{\sum_{s'} P(r_i | s'_i)P(s'_i)}. \qquad (4)$$

In (3) and (4) $r_i=(r_{1,i},r_{2,i},r_{3,i})$ denotes the received constellation point (the samples at APP demapper input), and $P(r_i|s_i)$ denotes conditional probability estimated from histograms. The LDPC decoders 220 used in the receiver 200 correspond to the LDPC encoders 106 in the transmitter 100 in terms of LDPC codes used. Extrinsic LLRs of LDPC decoders 220, that are defined as the difference between the decoder input and the output LLRs, are then forwarded to the APP demapper 216, (this step is denoted as an outer iteration) and the extrinsic information is iterated in both directions until convergence or until a predefined number of iterations has been reached. Suitable LDPC codes for use in the present coded-modulation scheme have been selected based upon EXIT chart analysis.

Figure 3:
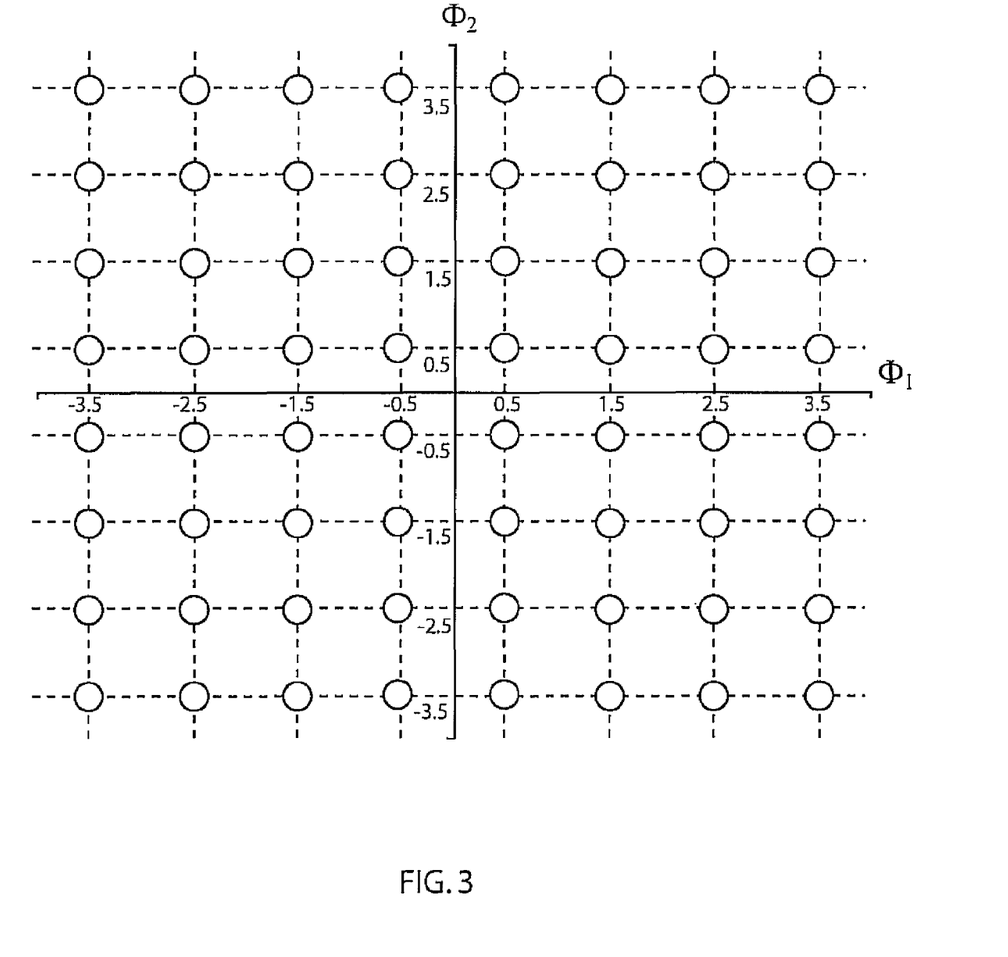
Figure 4:
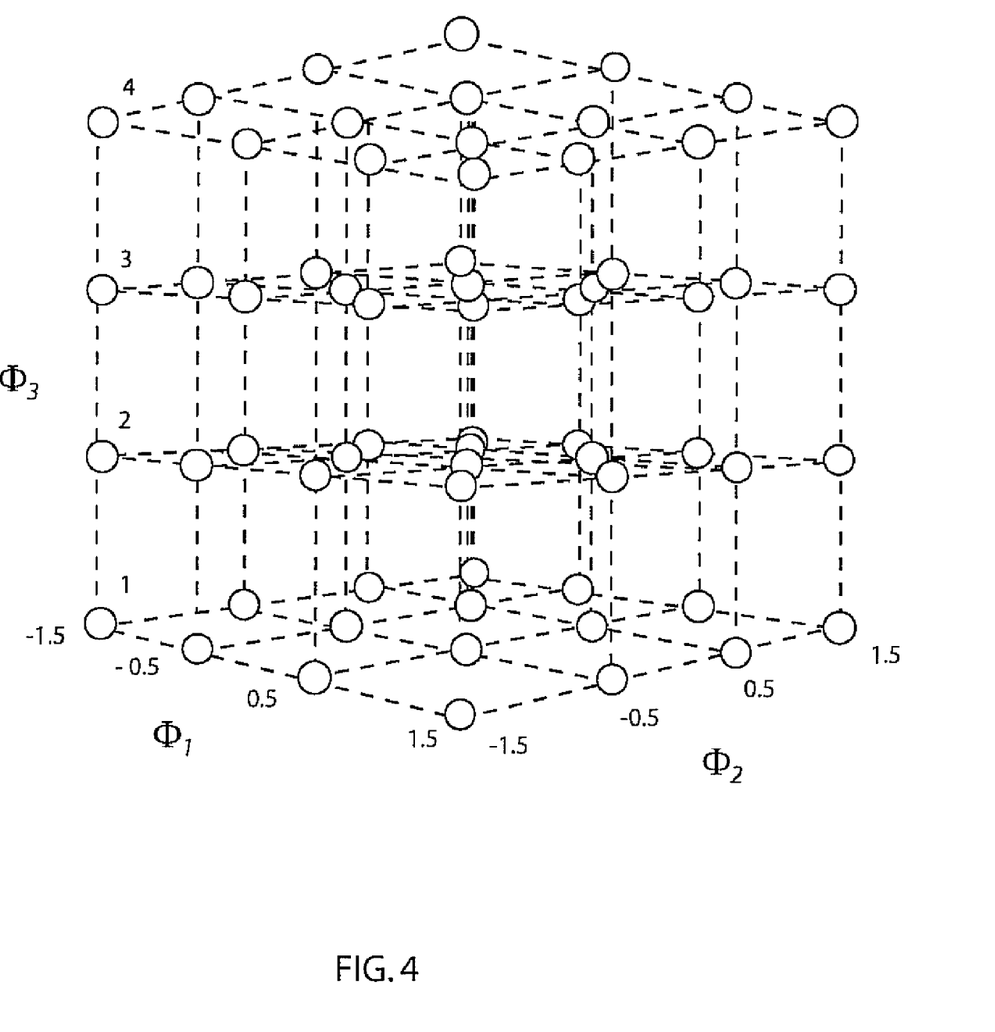

Referring to FIGS. 3 and 4, example constellation diagrams for a 64-ary: 2-dimensional constellation (FIG. 3), and a 3-dimensional constellation (FIG. 4) are illustratively shown. FIG. 3 shows a 2D Quadrature Amplitude Modulation (QAM) signal constellation, and FIG. 4 shows a corresponding 3D signal constellations for 64-ary transmission. In this case, by using a 40-Giga symbols/s symbol rate, we can achieve a 240-Gb/s aggregate rate. Using a 256-3D-constellation and 1024-3D-constellation with the same symbol rate, we can achieve 320-Gb/s and 400-Gb/s aggregate rate, respectively.

In one embodiment, identical LDPC(8547,6922) code employed in all encoders of the simulations and is of girth-8 LDPC code designed using the concept of BIBDs. The LDPC decoder may be based on min-sum-with-correction-term algorithm.

Results and conclusions: Simulations were completed for an additive white Gaussian noise (AWGN) channel model for 30 iterations in sum-product LDPC decoding algorithm, and 5 outer iterations (between the LDPC decoder and the natural demapper). The following signal constellations formats were observed: 64-QAM, 64-3D-constellation, 256-QAM, 256-3D-constellation, and 1024-3D-constellation. The 3D-constellation dimensions H are selected to be a power of 2, and we choose the number of h layers to be a multiple of 2, and w points per layer to be a perfect square. For example, in case of 64-ary, the constellation has 4 layers of 16 points each, providing the maximum separation distance among the points. For the other 2 cases, h×w were 4×64 and 16×64 for the 256-ary, and the 1024-ary signal constellations, respectively.

Figure 5:
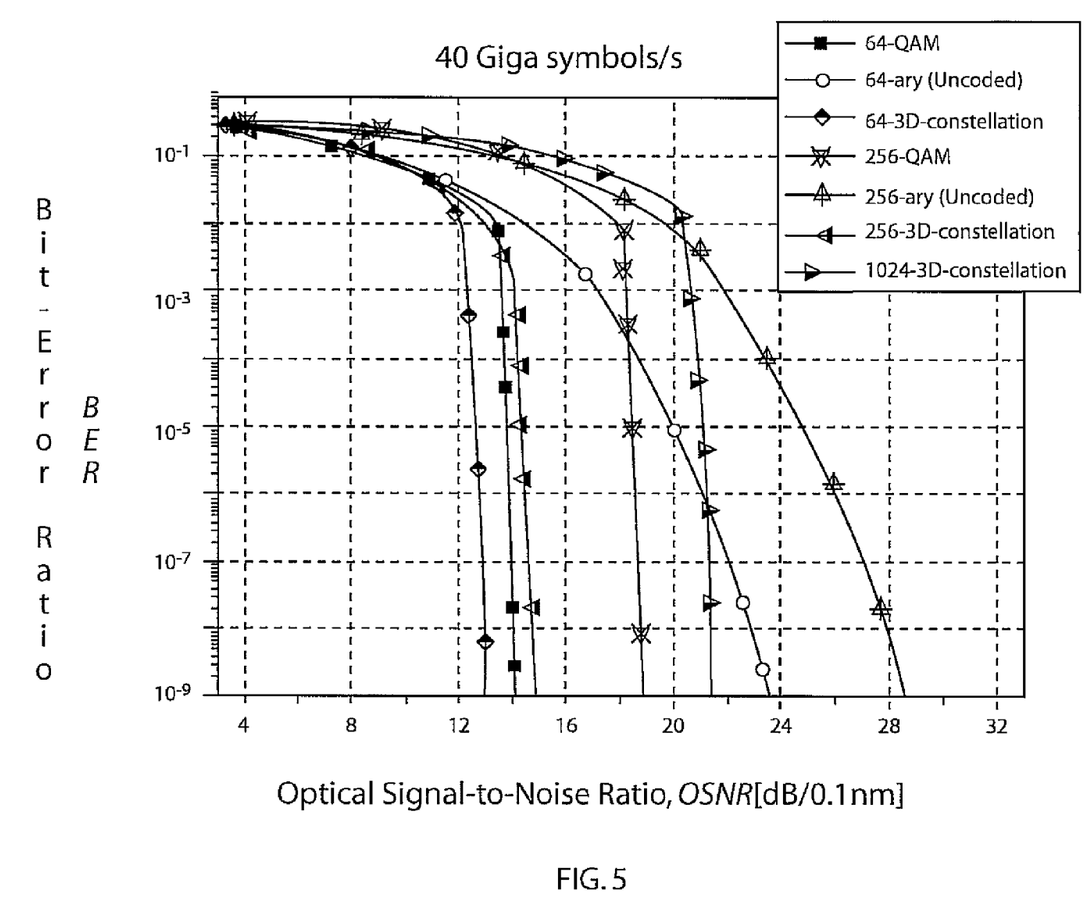
Figure 6:
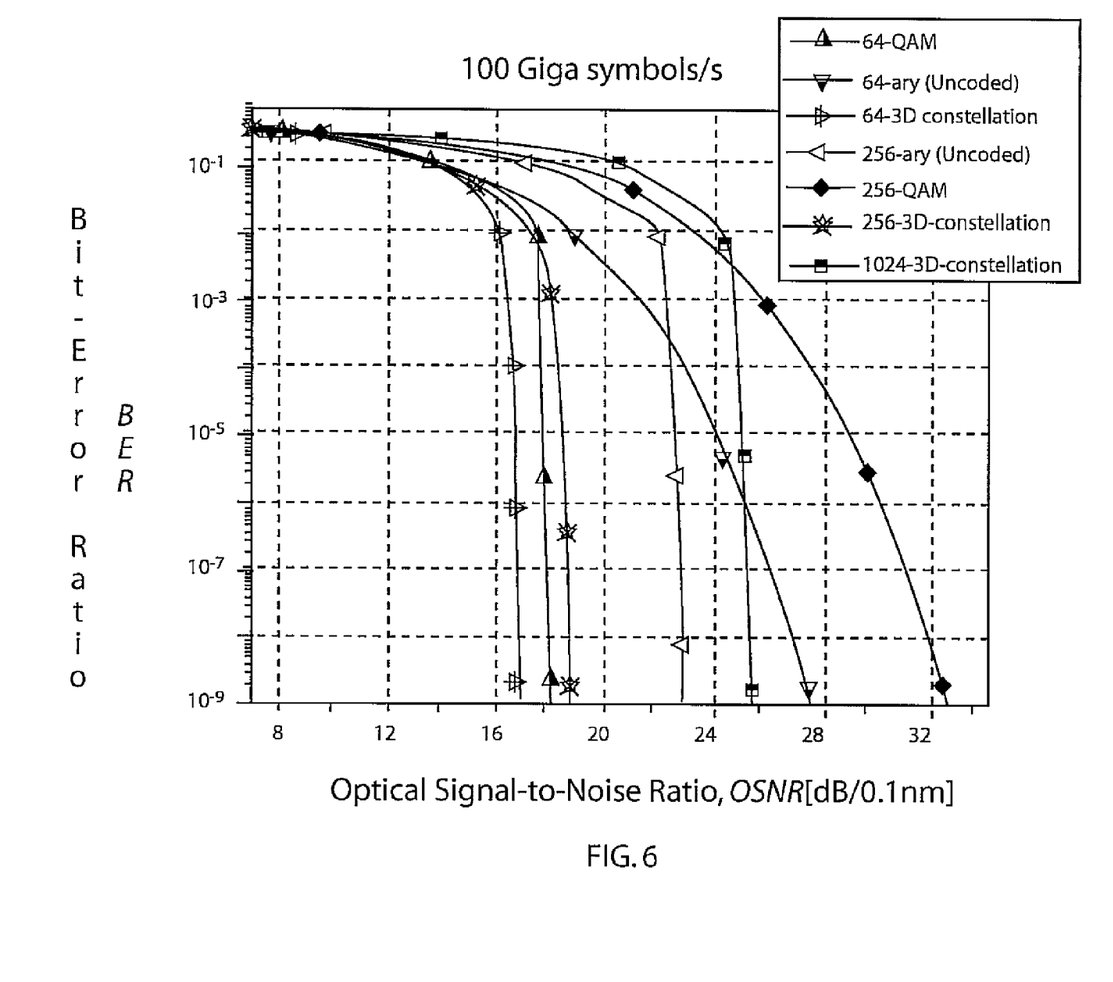

Referring to FIGS. 5 and 6, bit error rate (BER) performance versus optical-signal-to-noise ratio (OSNR) for the five cases described were shown in addition to uncoded cases for 40 Gb/s (FIG. 5) and 100 Gb/s (FIG. 6), respectively. Note that, as the constellation size grows the 3D-constellation BER performance improvement over corresponding 2D-constellation increases, reaching about 4.1 dB gain in the case of the 256-3D-constellation at BER of $10^{-9}$. These results motivated testing the 1024-3D-constellation, which is not practical in 2D, and interestingly, the results indicate that if compared to the 64-3D-constellation, a 16-fold increase in data rate causes only a penalty of 8 dB at BER of $10^{-9}$.

The net effective coding gains (at BER of $10^{-9}$) for 64-QAM and 256-QAM 2D-constellations are 9.5 dB and 10 dB, respectively. The corresponding coding gains for 3D-constellations are 10.5 dB and 14 dB, respectively.

An ultra-high spectrally efficient 3D-coded-modulation scheme, based on multilevel square QAM constellations, improves the BER performance of M-ary 2D-constellations. It is suitable for ultra-high-speed optical transmission beyond 320-Gb/s aggregate rate or even 1-Tb/s aggregate rate once 100-Gb/s technology reaches the maturity of today's 40-Gb/s systems.

Having described preferred embodiments of wavelength transmission system and method using 3-dimensional LDPC-coded modulation (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A transmitter, comprising:
    at least one low density parity check (LDPC) encoder configured to encode source data;
    a mapper configured to generate three coordinates in accordance with a three-dimensional (3D) signal constellation where the coordinates include an amplitude coordinate and two phase coordinates; and
    a power source outputting signals, where the signals are modulated in accordance with each of the three coordinates to provide a transmission signal.

2. The transmitter as recited in claim 1, wherein the at least one low density parity check (LDPC) encoder includes a plurality of encoders and the transmitter further comprises an interleaver to interleave encoded data source channels.

3. The transmitter as recited in claim 1, wherein the three-dimensional signal constellation coordinates include respective coefficients defined by orthonormal basis functions $\Phi_1$, $\Phi_2$, and $\Phi_3$, where T is a symbol duration and $0<t<T$ where $$\Phi_1(t) = \frac{1}{\sqrt{T}}\sin\left(\frac{2\pi t}{T}\right),$$

$$\Phi_2(t) = \frac{1}{\sqrt{T}}\cos\left(\frac{2\pi t}{T}\right),$$

$$\Phi_3(t) = \frac{1}{\sqrt{T}}.$$

4. The transmitter as recited in claim 1, wherein the three-dimensional signal constellation is formed using identical two-dimensional (2D) signal-constellation points constructed on equally spaced parallel layers.

5. The transmitter as recited in claim 4, wherein the equally spaced parallel layers are indexed by the amplitude coefficients and the 2D signal-coordinate points represent in-phase and quadrature coordinates.

6. A modulation method, comprising:
    encoding a signal using low density parity checking code;
    mapping the encoded signal to three coordinates using a three-dimensional constellation, the three coordinates including one associated with amplitude and two associated with phase; and
    modulating the encoded signal for transmission in accordance with said three coordinates.

7. The method as recited in claim 6, further comprising interleaving data from a plurality of encoders for input to a mapper for mapping the encoded signals.

8. The method as recited in claim 6, wherein the three coordinates coefficients are defined by orthonormal basis functions $\Phi_1$, $\Phi_2$ and $\Phi_3$, where T is a symbol duration and $0<t<T$ where $$\Phi_1(t) = \frac{1}{\sqrt{T}}\sin\left(\frac{2\pi t}{T}\right),$$

$$\Phi_2(t) = \frac{1}{\sqrt{T}}\cos\left(\frac{2\pi t}{T}\right),$$

$$\Phi_3(t) = \frac{1}{\sqrt{T}}.$$

9. The method as recited in claim 6, wherein the three-dimensional coordinates are is formed using identical two-dimensional (2D) signal-coordinate points constructed on equally spaced parallel layers.

10. The method as recited in claim 9, wherein the equally spaced parallel layers are indexed by the amplitude coordinates and the 2D signal-coordinates points representing in-phase and quadrature coordinates.

11. A demodulation method, comprising:
    demapping an input signal from three branches using a three-dimensional signal constellation, the three branches including a direct detection branch, and two coherent detection branches such that the direct detection branch detects an amplitude coordinate of the input signal and the two coherent detection branches detect in-phase and quadrature coordinates of the input signal;
    predicting bits using log-likelihood ratios (LLRs) for demapped bits; and iteratively decoding using at least one LDPC decoder configured to iteratively decode bits by feeding back extrinsic LLRs for demapping.

12. The method as recited in claim 11, wherein each of the three branches are associated with a corresponding three-dimensional constellation coordinate coefficient where the amplitude detection branch has an output that is proportional to $|S_i|^2$, and the in-phase and quadrature detection branches have outputs proportional to $Re\{S_iL^*\}$ and $Im\{s_iL^*\}$ where $S_i$ is a complex envelope of a received electrical field and L is a complex envelope of a local source electrical field.

13. The method as recited in claim 11, wherein the three-dimensional signal constellation is formed using identical two-dimensional (2D) signal-constellation points constructed on equally spaced parallel layers.

14. The method as recited in claim 13, wherein the equally spaced parallel layers are indexed by the amplitude coefficients and the 2D signal-constellation points representing in-phase and quadrature coordinates.

* * * * *